UNITED STATES PATENT OFFICE.

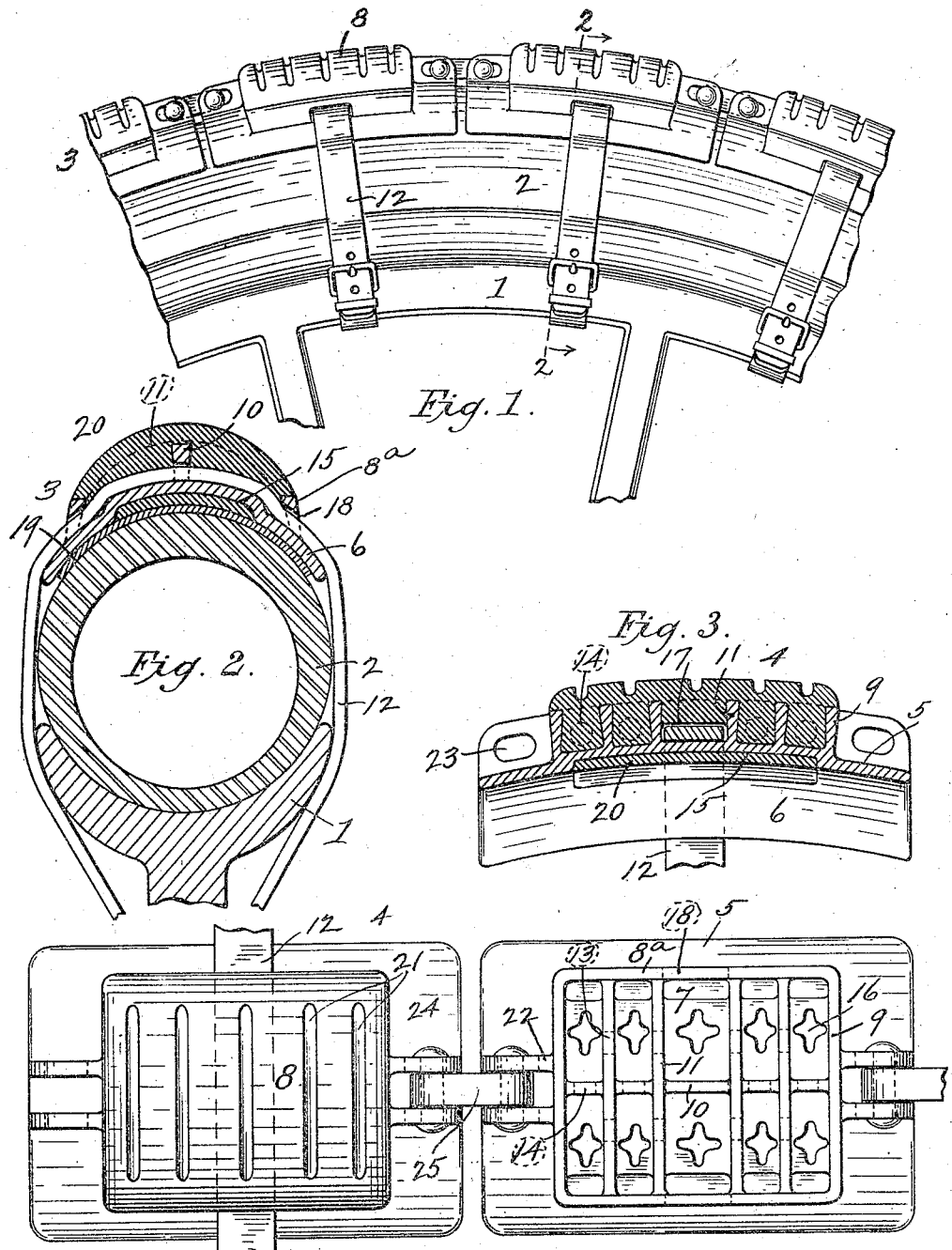

CHARLES R. SAUNDERS AND ANTON B. BREITWEG, OF CLEVELAND, OHIO.

GUARD FOR TIRES.

No. 906,304.　　　Specification of Letters Patent.　　　Patented Dec. 8, 1908.

Application filed February 21, 1907. Serial No. 358,546.

*To all whom it may concern:*

Be it known that we, CHARLES R. SAUNDERS and ANTON B. BREITWEG, citizens of the United States, residing at Cleveland, in the county of Cuyahoga and State of Ohio, have invented a certain new and useful Improvement in Guards for Tires, of which the following is a full, clear, and exact description, reference being had to the accompanying drawings.

Our invention relates to guards for protecting tires of vehicles, such as the pneumatic tires that are employed with automobiles, and has for its object to provide a device of this kind which may be readily applied to and removed from the tire; which will possess sufficient flexibility to compensate for the thrust produced on the individual members thereof when encountering the road bed or obstacles, and which will possess resiliency in itself, aside from the tire to which it may be applied. We accomplish these results by the construction illustrated in the drawings forming a part hereof, described in the specification and embodied in its essential combinations in the claims hereto annexed.

In the drawings, Figure 1 represents a side elevation of a portion of the felly and tire of a vehicle wheel, showing the manner of applying our protecting device thereto. Fig. 2 represents a transverse sectional view on the line 2—2 of Fig. 1. Fig. 3 represents a longitudinal sectional view through one of the elements or plates of our guard; and Fig. 4 is a plan view representing a pair of the elements or plates, the rubber tread being omitted from one of the same to illustrate the construction of the grid or frame therefor.

Describing the parts by reference numerals, 1 represents the felly of the vehicle wheel; 2 represents a pneumatic tire carried thereby, said tire being of any ordinary type, a hose p pe tire being shown for the purposes of illustration.

3 denotes our guard or protecting device, the same being shown in Figs. 1 and 2 as applied to the exterior surface of the tire. This protecting device is composed generally of a number of elements or plates 4, the same being joined by means of links to form a continuous articulated guard for the tire. Each of these plates comprises a body 5 which is generally convexo-concave in cross section, the concave inner surface of said body conforming generally to the contour of the tire with which the same is to be used and having integral side flanges 6, so shaped as to engage a considerable portion of each side of the tire and thus assist in preventing any side-slipping of the guard with respect to the tire.

The body of each of the plates 4 is preferably of metal and is provided, intermediate the sides and ends thereof, with the frame or grid 7 for the reception of a rubber tread piece 8. In order to retain this tread piece in position, the grid or frame 7 is constructed as follows:—The frame is generally rectangular in outline, having sides 8ª and ends 9 formed by integral flanges and is preferably cast with the body of the plate or element 5. 10 denotes an integral rib running longitudinally of the frame and connecting the central portions of the ends 9. 11 denotes a suitable number of transverse ribs connecting sides 8ª. The central transverse ribs are spaced a sufficient distance apart to receive therebetween the strap 12 by which each element is fastened to the felly.

The purpose of constructing the grid or frame is to enable the rubber, in a molten or plastic condition, to be inserted thereinto and, when vulcanized, to be retained in place therein. To provide suitable means for retaining the rubber in place, we taper the ribs and the side and end flanges of the frame in such manner as to form a plurality of pockets, the width whereof increases from the top to the bottom thereof, as indicated more particularly in Figs. 2 and 3. As will appear from the former figure, the upper inner ends of flanges 8ª and 9 overhang the bottoms thereof, and the same is true as to ribs 10 and 11. This provides a series of downwardly enlarged pockets between the ribs 10 and 11 and flanges 8ª and 9 which, when the tread has been vulcanized into the grid, will tend to retain the same firmly in place. To further assist in maintaining the tread in place, suitable apertures 13 are provided in ribs 11, preferably between the longitudinal rib 10 and the side flanges 8ª, and similar perforations 14 are provided in rib 10 between the ribs 11 and between said ribs and the end flanges 9. Furthermore, the bottom of the plate 5 is arched upwardly to form a concavity 15 beneath the grid portion thereof which corresponds generally in contour with the contour of the tire.

16 denotes a plurality of apertures in the bottom of the plate intermediate of the transverse ribs 11 and on both sides of the central rib 10. These apertures may be of the shape shown in Fig. 4, and their object is to permit the softened or molten rubber which is placed into the grid to flow into the cavity 15 and be spread out therein. It will be apparent that, by the provision of this cavity and apertures 13, 14 and 16 the tread will be firmly locked in place within the grid when vulcanized therein.

The longitudinal rib 10 and the side flanges 8$^a$ are provided, about midway thereof, with apertures 17 and 18 respectively of such width and height as to accommodate the strap 12 by means of which the plates or elements are fastened to the tire and felly.

If desired, the strap may be inserted in place before vulcanization or a removable substitute therefor can be inserted and removed after vulcanization, to permit the insertion of the strap into the apertures. With each plate or element there may be employed a lining 19 of rubber or similar material to prevent direct contact between the said plate or element and the tire. The rubber flowing through the apertures 16 will completely fill the cavity 15 below the body of the plate 5, as shown at 20, and form a secure locking engagement between the tread and the metallic plate 5. At the same time, the portion 20 of the tread prevents the edges of the cavity 15 from bearing against the tire and forms a cushion between the plate 4 and the tire, thus prolonging the life of the tire. The lining 19 prevents the outer portions of the plate from bearing against the tire. The rubber treads 8 may be provided with transverse grooves 21 to prevent slip between the tread and the road bed or pavement.

A convenient manner of connecting the individual elements is disclosed in Figs. 3 and 4. This means comprises integral lugs 22 in the space between the ends of the frame and the ends of the plate, the lugs being each provided with an elongated slot 23 therein for the reception of a bolt 24.

25 denotes a link adapted to be inserted between the lugs of adjacent plates or elements and provided with circular apertures therethrough for the reception of the bolts 24.

By reason of the elongation of the slots 23, the guard is rendered flexible, provision being made thereby for some relative movement of one guard plate with respect to another on the impact of a plate with the road bed or pavement.

We claim:

1. A guard for vehicle tires comprising a plurality of plates or members flexibly connected, each of said plates or members comprising a base, a grid formed therewith, said grid comprising a frame having sides and ends and ribs extending transversely thereof and connecting said sides, the upper portions of said ribs, sides and ends overhanging the lower portions thereof, and a yielding tread in said grid, substantially as specified.

2. A guard for vehicle tires comprising a plurality of plates or members flexibly connected, each of said plates or members having a base and a grid integral therewith, said grid comprising a frame having sides and ends, and ribs or partitions extending longitudinally and transversely of said frame and provided with apertures therethrough, and a resilient tread in said grid interlocking with said apertures, substantially as specified.

3. A guard for vehicle tires, comprising a plurality of plates or members flexibly connected, each of said members having a frame, lugs projecting longitudinally of said plates or members from the ends of the frames, said lugs being provided with elongated slots, links extending between the lugs of adjacent frames, bolts extending through said links and the elongated slots in the lugs and yielding treads in said frames projecting outwardly beyond said lugs.

4. A guard for vehicle tires comprising a plurality of base plates flexibly connected, each of said plates having thereon a frame and said frame having beneath the bottom thereof an outwardly projecting cavity with one or more apertures extending through said bottom into said cavity, and a resilient tread in said frame and having a portion in said cavity adapted to form a cushion for the tire and connected with the main portion of the tread through the aperture or apertures in the bottom of said frame, substantially as specified.

5. A guard for vehicle tires comprising a plurality of base plates flexibly connected, each of said plates having thereon a frame provided with one or more apertured ribs connecting opposite portions thereof and having an apertured bottom provided with an outwardly projecting cavity, and a resilient tread in said frame and said cavity having its different portions connected through the said apertures, substantially as specified.

6. A guard for vehicle tires comprising a plurality of flexibly-connected plates each having a frame provided with apertured transverse and longitudinal ribs therein, and a resilient tread in said frame having its various portions interlocked through the apertures in said ribs, substantially as specified.

In testimony whereof, we hereunto affix our signatures in the presence of two witnesses.

CHARLES R. SAUNDERS.
ANTON B. BREITWEG.

Witnesses:
J. B. HULL,
NATHAN F. FRETTEN